United States Patent
He et al.

(10) Patent No.: US 11,237,676 B2
(45) Date of Patent: Feb. 1, 2022

(54) TOUCH SUBSTRATE, TOUCH DISPLAY PANEL, TOUCH DISPLAY DEVICE AND TOUCH DRIVING METHOD

(71) Applicants: Hefei Xinsheng Optoelectronics Technology Co., Ltd., Anhui (CN); BOE Technology Group Co., Ltd., Beijing (CN)

(72) Inventors: Min He, Beijing (CN); Jing Wang, Beijing (CN); Xiaodong Xie, Beijing (CN); Xinxiu Zhang, Beijing (CN); Yaying Li, Beijing (CN); Peng Zeng, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 44 days.

(21) Appl. No.: 16/606,331

(22) PCT Filed: Mar. 22, 2019

(86) PCT No.: PCT/CN2019/079292
§ 371 (c)(1),
(2) Date: Oct. 18, 2019

(87) PCT Pub. No.: WO2019/242361
PCT Pub. Date: Dec. 26, 2019

(65) Prior Publication Data
US 2021/0223908 A1    Jul. 22, 2021

(51) Int. Cl.
*G06F 3/044* (2006.01)

(52) U.S. Cl.
CPC .......... *G06F 3/0443* (2019.05); *G06F 3/0448* (2019.05); *G06F 2203/04112* (2013.01)

(58) Field of Classification Search
CPC ................. G06F 3/0443; G06F 3/0448; G06F 2203/04112; G06F 3/0412; G06F 3/0416;
(Continued)

(56) References Cited

U.S. PATENT DOCUMENTS

| 10,261,635 B2 | 4/2019 | Gu et al. |
| 2013/0093706 A1* | 4/2013 | Kurasawa ............ G09G 3/2074 345/173 |

(Continued)

FOREIGN PATENT DOCUMENTS

| CN | 103268177 A | 8/2013 |
| CN | 103279222 A | 9/2013 |

(Continued)

OTHER PUBLICATIONS

Office Action dated Jan. 3, 2020 issued in corresponding Chinese Application No. 201810645537.1.

*Primary Examiner* — Md Saiful A Siddiqui
(74) *Attorney, Agent, or Firm* — Nath, Goldberg & Meyer; Joshua B. Goldberg (57) ABSTRACT

A touch substrate, a touch display panel, a touch display device, and a touch driving method are provided. The touch substrate includes: a base substrate, on which a touch electrode pattern is formed. The touch electrode pattern includes at least one electrode group, and each electrode group includes a driving electrode and a sensing electrode which are arranged in a row along a first direction of the base substrate and insulated from each other. In each electrode group, the driving electrode has a plurality of driving electrode portions coupled to each other, and the sensing electrode has a plurality of sensing electrode blocks. Each driving electrode portion is respectively between two adja- (Continued)

cent sensing electrode blocks; and the sensing electrode block has a plurality of sensing electrode regions with different areas.

18 Claims, 7 Drawing Sheets

(58) Field of Classification Search
CPC ........... G06F 3/044; G06F 2203/04104; G06F 2203/04111
See application file for complete search history.

(56) References Cited

U.S. PATENT DOCUMENTS

| | | |
|---|---|---|
| 2014/0168147 A1 | 6/2014 | Huang |
| 2014/0354301 A1* | 12/2014 | Trend .................... G06F 3/0448 324/658 |
| 2015/0234495 A1* | 8/2015 | Lo ........................... G06F 3/045 345/174 |
| 2016/0041643 A1 | 2/2016 | Gu et al. |
| 2016/0041654 A1* | 2/2016 | Bulea ...................... G06F 3/041 345/174 |
| 2016/0252989 A1* | 9/2016 | Zhang .................. G06F 3/0443 345/173 |
| 2020/0089384 A1 | 3/2020 | Wang et al. |

FOREIGN PATENT DOCUMENTS

| | | |
|---|---|---|
| CN | 103677410 A | 3/2014 |
| CN | 106249979 A | 12/2016 |
| CN | 108829297 A | 11/2018 |

* cited by examiner

TOUCH SUBSTRATE, TOUCH DISPLAY PANEL, TOUCH DISPLAY DEVICE AND TOUCH DRIVING METHOD

CROSS-REFERENCE TO RELATED APPLICATIONS

This is a National Phase Application filed under 35 U.S.C. 371 as a national stage of PCT/CN2019/079292 filed on Mar. 22, 2019, which claims the priority of the Chinese Patent Application No. 201810645537.1, filed on Jun. 21, 2018, the content of each which is incorporated herein by reference in its entirety.

TECHNICAL FIELD

The disclosure relates to the field of touch technology, in particular, to a touch substrate, a touch display panel, a touch display device, and a touch driving method.

BACKGROUND

Touch technologies mainly include a resistive touch technology, a capacitive touch technology, and an infrared optical touch technology. The capacitive touch technology has advantages such as sensitive response, and is therefore widely used in smart phones and tablet computers.

The capacitive touch screens mainly include one glass solution (OGS) touch screens, on-cell touch screens and in-cell touch screens. In the OGS touch screen, a substrate with a touch function is attached to the outside of a display panel. In the on-cell touch screen, a touch electrode pattern with the touch function is formed on a color filter substrate of a display panel. In the in-cell touch screen, a touch electrode pattern with the touch function is formed inside a display panel.

SUMMARY

As an aspect of the disclosure, a touch substrate is provided, which includes: a substrate, on which a touch electrode pattern is formed. The touch electrode pattern includes at least one electrode group, and each electrode group includes a driving electrode and a sensing electrode which are arranged in a row along a first direction of the base substrate and insulated from each other. In each electrode group, the driving electrode has a plurality of driving electrode portions coupled to each other, and the sensing electrode has a plurality of sensing electrode blocks. Each driving electrode portion is respectively between two adjacent sensing electrode blocks; and the sensing electrode block has a plurality of sensing electrode regions with different areas.

In an embodiment, the plurality of driving electrode portions are coupled end to end and arranged in a zigzag form along the first direction of the base substrate.

In an embodiment, one sensing electrode block is formed on each of two opposite sides of each driving electrode portion.

In an embodiment, a sensing electrode block, which is on one side of each of the driving electrode portions extending in a second direction intersecting the first direction, has a width along the second direction, which is gradually decreased as being distal to the driving electrode portion; and a sensing electrode block, on the other side of the driving electrode portion, has a width along the second direction, which is gradually decreased as being distal to the driving electrode portion.

In an embodiment, each sensing electrode block has a triangle or trapezoid shape.

In an embodiment, each of the sensing electrode blocks has a right triangle shape, and one leg and a hypotenuse of each sensing electrode block are respectively parallel to two adjacent driving electrode portions.

In an embodiment, a longer leg of each sensing electrode block has a length in a range of 10 mm to 30 mm; and a shorter leg of each sensing electrode block has a length in a range of 4 mm to 10 mm.

In an embodiment, two legs of each sensing electrode block have lengths of 7 mm and 20 mm.

In an embodiment, each sensing electrode block has a right trapezoid shape; and a longer base and a side of each sensing electrode block are respectively parallel to two adjacent driving electrode portions.

In an embodiment, the driving electrode and the sensing electrode are on a same layer, and the driving electrode portions are spaced apart from the sensing electrode blocks.

In an embodiment, the driving electrode and the sensing electrode each have a metal mesh structure.

In an embodiment, extension directions of two adjacent driving electrode portions form a first angle that is an acute angle.

In an embodiment, an extension direction of one of the two adjacent driving electrode portions is parallel to the second direction, and an extension direction of the other of the two adjacent driving electrode portions is at an angle equal to the first angle with respect to the second direction.

In an embodiment, the touch substrate further includes a plurality of driving electrode lines and a plurality of sensing electrode lines on the base substrate. The driving electrode is respectively coupled to a corresponding driving electrode line; and the sensing electrode blocks are respectively coupled to corresponding sensing electrode lines.

In an embodiment, the touch substrate further includes bonding pins for the driving electrode lines and bonding pins for the sensing electrode lines. The bonding pins for the driving electrode lines and the bonding pins for the sensing electrode lines are in a non-display region on a same side of the base substrate.

In an embodiment, the touch substrate further includes a color filter layer on a surface of the base substrate opposite to a surface of the base substrate on which the touch electrode pattern is formed.

As an aspect of the disclosure, a method for driving a touch substrate is provided. The touch substrate includes a base substrate, on which a touch electrode pattern is formed. The touch electrode pattern includes at least one electrode group, and each electrode group includes a driving electrode and a sensing electrode which are arranged in a row along a first direction of the base substrate and insulated from each other. In each electrode group, the driving electrode has a plurality of driving electrode portions coupled to each other, and the sensing electrode has a plurality of sensing electrode blocks. Each driving electrode portion is respectively between two adjacent sensing electrode blocks; and the sensing electrode block has a plurality of sensing electrode regions with different areas. The method includes: applying a driving signal to the driving electrode; and detecting a change in signal before and after a touch occurs so as to determine a touched position on the touch substrate, wherein the change in signal is a change in signal between a touched sensing electrode region of the sensing electrode block and the driving electrode.

As an aspect of the disclosure, a touch display panel including the touch substrate described above is provided.

As an aspect of the disclosure, a touch display device including the touch display panel described above is provided.

As an aspect of the disclosure, a keyboard including the touch display panel described above is provided, wherein the touch display panel is provided in a peripheral region of the keyboard.

BRIEF DESCRIPTION OF THE DRAWINGS

The accompanying drawings, which are incorporated in and constitute a part of this specification, illustrate embodiments consistent with the disclosure, and serve to explain the principles of the disclosure in conjunction with the description.

FIG. 4-1 is a schematic diagram showing a structure of a touch substrate according to an exemplary embodiment of the disclosure;

FIG. 4-2 is a schematic diagram showing a structure of a sensing electrode block according to an exemplary embodiment of the disclosure;

FIG. 4-3 is schematic diagram showing a structure of a sensing electrode block according to an exemplary embodiment of the disclosure;

FIG. 4-4 is an enlarged diagram of region A in FIG. 4-3;

DETAILED DESCRIPTION

The exemplary embodiments, examples of which are illustrated in the accompanying drawings, will be described in detail herein. In the drawings, the same numerals in different drawings represent the same or similar elements unless otherwise indicated. The implementations described in the following exemplary embodiments do not represent all implementations consistent with the disclosure. Rather, they are merely examples of devices and methods consistent with aspects of the disclosure, as detailed in the appended claims.

In general, a touch electrode pattern includes a driving electrode and a sensing electrode. The driving electrode may include a plurality of driving electrode blocks arranged in a lateral direction, and the sensing electrode includes a plurality of sensing electrode blocks arranged in a longitudinal direction. The touch position is recognized by detecting a change in capacitance between the driving electrode blocks and the sensing electrode blocks before and after the occurrence of a touch.

An embodiment of the disclosure provides a touch substrate, which includes: a base substrate on which a touch electrode pattern is formed.

The touch electrode pattern includes at least one electrode group, and each electrode group includes a driving electrode and a sensing electrode that are arranged in one row along a first direction of the base substrate and are insulated from each other.

In each electrode group, the driving electrode has a plurality of driving electrode portions coupled to each other, and the sensing electrode includes a plurality of sensing electrode blocks.

Each of the driving electrode portions is positioned between two adjacent sensing electrode blocks.

The sensing electrode block has a plurality of sensing electrode regions with different areas.

The base substrate is a substrate with a touch electrode pattern formed thereon. The base substrate may be a glass substrate or any other suitable substrate.

The touch substrate may be a color filter substrate or an array substrate of a display panel, or a separate substrate that may realize the touch function.

The touch electrode pattern formed on the base substrate includes a driving electrode and a sensing electrode that are insulated from each other. The driving electrode and the sensing electrode are distributed along the first direction of the base substrate. The first direction of the base substrate may be any direction of the base substrate, for example, a lateral direction (e.g., a length direction) or a longitudinal direction (e.g., a width direction) of the base substrate, or an oblique direction at an angle with respect to the lateral direction of the base substrate.

The base substrate may include one or more rows each comprising the driving electrode and the sensing electrode and extending in the first direction. The driving electrode in each row may have a plurality of driving electrode portions coupled to each other. The driving electrode portions may be located at different positions, and the driving electrode portions may be electrically coupled to each other through a connection line. Alternatively, the driving electrode portions may be formed as one piece.

The sensing electrode in each row includes a plurality of sensing electrode blocks. Each sensing electrode block is an unitary (or a single) sensing electrode block and has a plurality of sensing electrode regions, and the plurality of sensing electrode regions have different areas. Each driving electrode portion is located between two adjacent sensing electrode blocks. That is, a driving electrode portion is disposed between two adjacent sensing electrode blocks.

When a driving signal is applied to the driving electrode portion, a capacitance between the sensing electrode region and the driving electrode portion adjacent thereto and a capacitance thereof to earth are generated. When a region is touched, the capacitance between the sensing electrode region corresponding to the touched region and the driving electrode portion adjacent thereto and the capacitance thereof to earth, may be changed, so that a change in the signal from the sensing electrode regions in the sensing electrode block corresponding to the touched region can be detected. Since the sensing electrode block has the plurality of sensing electrode regions with different areas, the capacitances between different sensing electrode regions and the driving electrode portion and the capacitance thereof to earth may be changed before and after the occurrence of the touch, such that the change amounts of the detected signals may differ. A coordinate of the touched region in a column direction, the row where the touched region is located, can be determined according to the row of the driving electrode applied with the driving signal. The position of the touched sensing electrode region can be determined according to change amounts of the signals from the sensing electrode regions with different areas in the sensing electrode block, that is, the position coordinate of the touched region in a row direction can be determined, and accordingly the touch position can be determined. Since a plurality of sensing electrode blocks are provided, and each sensing electrode block has a plurality of sensing electrode regions, a plurality of touch positions can be determined for realizing multi-touch.

In the touch substrate above, a plurality of touch positions may be determined by using one sensing electrode block. The number and the areas of the sensing electrode regions in each of the sensing electrode blocks are related to the positioning accuracy and the signal sensitivity.

Figure 1:
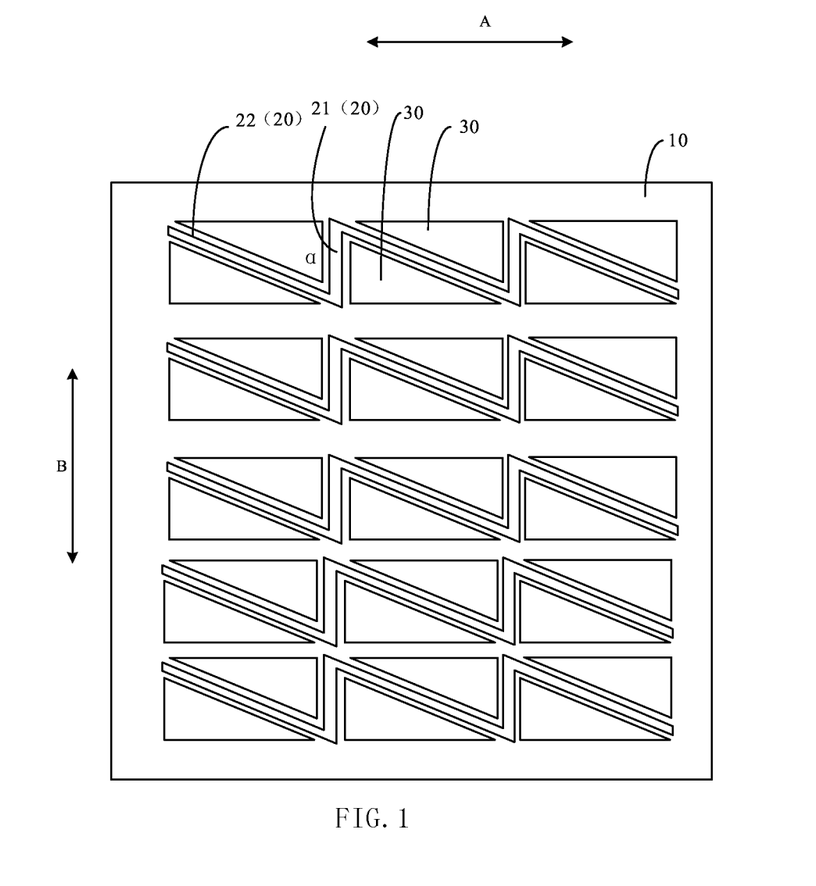
FIG. 1 is a schematic diagram showing a structure of a touch substrate according to an exemplary embodiment of the disclosure.

FIG. 1 is a schematic diagram showing a structure of a touch substrate according to an exemplary embodiment of the disclosure. Referring to FIG. 1, the touch substrate includes: a base substrate 10 on which a touch electrode pattern is formed.

The touch electrode pattern includes a plurality of rows each including a driving electrode and a sensing electrode and extending a first direction of the base substrate 10, and the driving electrode and the sensing electrode are located on the same layer.

The driving electrode has a plurality of driving electrode portions 20 coupled to each other (e.g., in an end-to-end manner), and the sensing electrode includes a plurality of sensing electrode blocks 30.

Each driving electrode portion 20 is located between two adjacent sensing electrode blocks 30, and each driving electrode portion 20 is spaced apart from each sensing electrode block 30.

The sensing electrode block 30 has a plurality of sensing electrode regions having different areas.

FIG. 1 schematically shows five rows each including the driving electrode and the sensing electrode and extending in the first direction. In practical applications, a size of the base substrate may be selected according to the size required for the touch substrate, and the number of the rows may be set as required.

The first direction in FIG. 1 is shown as a lateral direction of the base substrate, for example, a direction indicated by an arrow A in FIG. 1. In the conventional touch electrode pattern, only one of the driving electrode and the sensing electrode is disposed in each row along the lateral direction, and the other of the driving electrode and the sensing electrode is disposed along the longitudinal direction (which is perpendicular to or intersects the lateral direction, for example, a direction indicated by an arrow B in FIG. 1) of the base substrate. In the present embodiment, along the first direction of the base substrate 10, both of the driving electrode and the sensing electrode are arranged in each row, and the driving electrode and the sensing electrode are located on the same layer.

As shown in FIG. 1, the driving electrode in each row has a plurality of driving electrode portions 20 coupled to each other end to end and arranged in a zigzag form along the first direction of the base substrate 10. The sensing electrode includes a plurality of sensing electrode blocks 30, and each driving electrode portion 20 is spaced apart from each sensing electrode block 30. That is, the driving electrode portion 20 is spaced apart from the sensing electrode block 30 by a certain distance, so that the driving electrode portion 20 and the sensing electrode block 30 are insulated from each other.

In this embodiment, the driving electrode and the sensing electrode may be made of the same material. Each driving electrode portion is spaced apart from each sensing electrode block by a certain distance, so as to realize the insulation between the driving electrode and the sensing electrode without any insulating layer. The driving electrode and the sensing electrode may be formed by one patterning process, therefore the preparation process of the touch electrode pattern can be simplified, the preparation material can be saved, and the preparation cost can be reduced.

Alternatively, the driving electrode and the sensing electrode may be located on two different layers, and the layer where the driving electrode is located and the layer where the sensing electrode is located may be insulated by an insulating layer.

Figure 2:
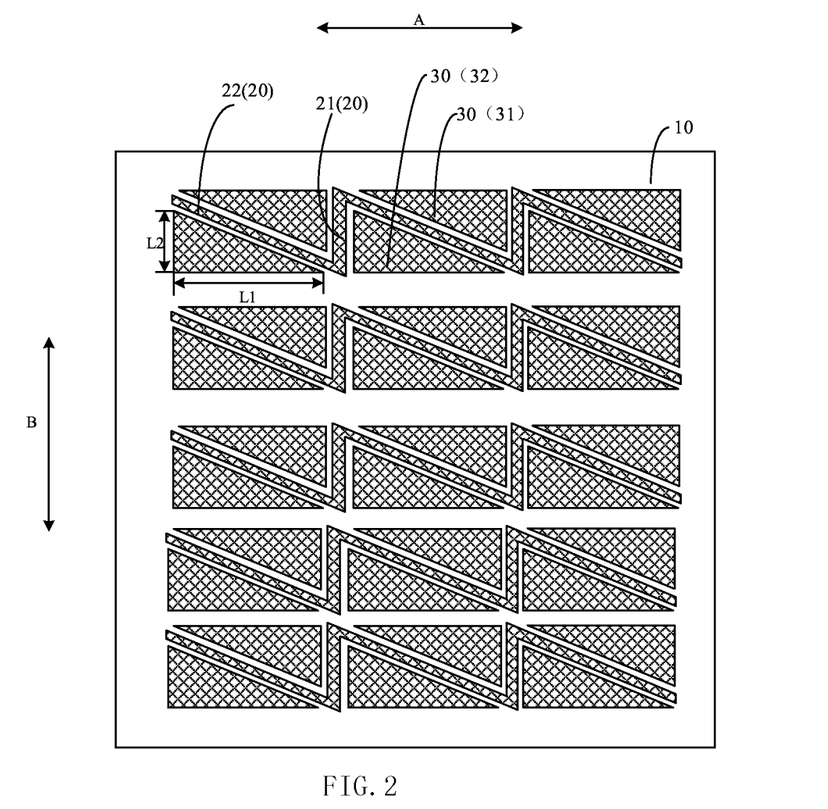
FIG. 2 is a schematic diagram showing a structure of a touch substrate according to an exemplary embodiment of the disclosure.

FIG. 2 is a schematic diagram showing a structure of a touch substrate according to another exemplary embodiment of the disclosure. As shown in FIG. 2, the driving electrode (having a plurality of driving electrode portions 20) and the sensing electrode (having a plurality of sensing electrode blocks 30) may be formed by a metal mesh film layer.

When a display panel with a touch function is manufactured with a touch substrate, since the touch electrode pattern is in an image display region of the display panel, the touch electrode pattern is required to be made of a transparent conductive material, such as Indium Tin Oxide (ITO) having good conductivity and transparency, in order to ensure that the touch electrode pattern does not influence the display of an image. However, when the touch electrode pattern is manufactured by using ITO, especially when the touch electrode pattern is applied to a large-size touch display panel, since ITO has a large resistivity, problems such as the attenuation of a driving signal and distortion of a detection signal easily occur, and thus the accuracy of positioning of a touch position is reduced.

In this embodiment, the driving electrode and the sensing electrode are made of the metal mesh film layer. That is, the driving electrode and the sensing electrode are made of a metal conductive material, for example, the metal with a low resistivity, such as silver or copper. Since the metal conductive material has a resistivity that is much smaller than that of ITO, the conductivity of the driving electrode and the sensing electrode can be improved.

The metal mesh film layer is made of a metal conductive material and includes a plurality of metal wires which intersect with each other along the lateral direction and the longitudinal direction. The metal wire has a small wire width generally in the order of micron, for example, less than 5 microns, and the metal mesh film layer has a very thin thickness, so that the metal mesh film layer is invisible to human eyes. Further, the openings of the mesh allow the light to transmit therethrough, and therefore the metal mesh film layer has good conductivity and light transmittance.

The driving electrode and the sensing electrode may be made of the metal mesh film layer, so that the resistivity of the driving electrode and the resistivity of the sensing electrode can be reduced, and the identification accuracy of the touch position is improved.

In an embodiment, the extension directions of two adjacent driving electrode portions form a first angle.

FIG. 1 shows two adjacent driving electrode portions 20, for example, a first driving electrode portion 21 and a second driving electrode portion 22 in FIG. 1 are two adjacent driving electrode portions. An extension direction of the first driving electrode portion 21 and an extension direction of the second driving electrode portion 22 form a first angle α, which is an acute angle and may be set empirically.

The extension directions of two adjacent driving electrode portions may be flexibly set. In some examples, as shown in FIG. 1, for example, the extension direction of the first driving electrode portion 21 is a second direction which is perpendicular to or intersects with the first direction, for example, the direction indicated by the arrow B in FIG. 1, and the extension direction of the second driving electrode portion 22 is at an angle α with regard to the second direction.

For example, the driving electrode and the sensing electrode are arranged along the first direction of the base substrate. The extension direction of the first driving electrode portion 21 is a second direction, that is, the first driving electrode portion 21 extends along the second direction of the base substrate; and the extension direction of the second driving electrode portion 22 is an oblique direction, that is, the second driving electrode portion 22 extends along an oblique direction at a certain angle α with regard to the second direction.

Referring to FIG. 1, each of the driving electrode portions 20 may have a strip shape, i.e., a length of the driving electrode portion 20 is greater than a width thereof. The strip-shaped driving electrode portion 20 is located between two adjacent sensing electrode blocks 30. An included angle between the first driving electrode portion 21 and the second driving electrode portion 22 adjacent to each other, i.e., a first angle α, is for example an acute angle, such as 30° to 60°.

It should be noted that the driving electrode shown in FIG. 1 is formed as an integral structure as one piece. A portion of the driving electrode disposed between two adjacent sensing electrode blocks 20 may serve as one driving electrode portion 20, and each driving electrode portion 20 is located at a different position. As can be seen from FIG. 1, each driving electrode portion 20 is located between two adjacent sensing electrode blocks 30. The driving electrode portion 20 in FIG. 1 has a strip shape, and the driving electrode including the driving electrode portions 20, which are connected in a end to end manner, is formed into a folded structure in a zigzag shape.

In an embodiment, referring to FIG. 1, for the driving electrode portions and the sensing electrode blocks in each row, one sensing electrode block 30 is disposed on each of two opposite sides of each driving electrode portion 20.

In this embodiment, one sensing electrode block 30 is disposed on each of two opposite sides of each driving electrode portion 20. For example, in FIG. 1, one sensing electrode block 30 is disposed on each of the left and right sides of the first driving electrode portion 21, and one sensing electrode block 30 is disposed on each of the upper and lower sides of the second driving electrode portion 22. Each driving electrode portion 20 may form capacitors together with two sensing electrode blocks 30 adjacent to the driving electrode portion 20. When a touch occurs, an amount of the change in signal from the touched sensing electrode region of the sensing electrode block may increase, which is advantageous for improving the identification accuracy of the touch position.

Further, a width in the second direction of the sensing electrode block 30, which is located on one side (e.g., the left side) of the first driving electrode portion 21, is gradually decreased as being distal to the first driving electrode portion 21. A width in the second direction of the sensing electrode block 30, which is located at the other side (e.g., the right side) of the first driving electrode portion 21, is gradually decreased as being distal to the first driving electrode portion 21. In other words, the portion, which is most close to the driving electrode portion 21, of each of two sensing electrode blocks 30 on both sides of the driving electrode portion 21 has a maximum width; and the portion, which is farthest from the driving electrode portion 21, of each of two sensing electrode blocks 30 on both sides of the driving electrode portion 21 has a minimum width.

In this embodiment, the sensing electrode block has a regular shape. Referring to FIG. 2, among two sensing electrode blocks each having one side close to the driving electrode portion 21, a width in the second direction of the sensing electrode block (i.e., a first sensing electrode block 31), which is on one side (e.g., the left side) of the driving electrode portion 20, is gradually decreased as being distal to the driving electrode portion 20. That is, the width in the second direction B of the first sensing electrode block 31 is gradually widened from left to right along the first direction of the base substrate 10. A width in the second direction of the sensing electrode block (i.e., a second sensing electrode block 32), which is on the other side (e.g., the right side) of the driving electrode portion 21, is gradually decreased as being distal to the driving electrode portion 21. That is, the width in the second direction of the second sensing electrode block 32 is gradually narrowed from left to right along the first direction of the base substrate 10.

Figure 3:
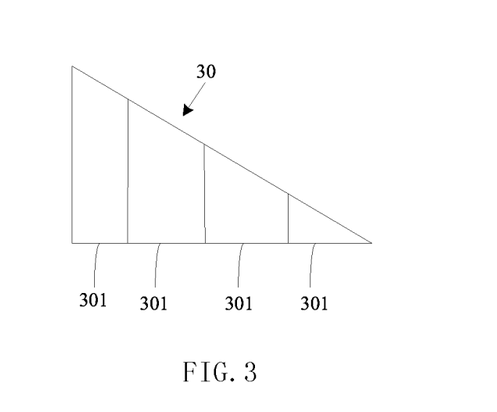
FIG. 3 is a schematic diagram showing a structure of a sensing electrode block according to an exemplary embodiment of the disclosure.

FIG. 3 is a schematic diagram showing a structure of a sensing electrode block according to an exemplary embodiment of the disclosure. Since a width of the sensing electrode block in the second direction changes, the sensing electrode block may be divided into a plurality of portions along the first direction. As shown in FIG. 3, the sensing electrode block 30 may have a triangle shape, such as a right triangle shape, and the triangular sensing electrode block 30 may be divided into a plurality of sensing electrode regions. For example, as shown in FIG. 3, the sensing electrode block 30 is divided into four portions. Each portion forms a sensing electrode region 301, and the areas of the sensing electrode regions 301 are different from each other, such that the capacitances between the sensing electrode regions and the driving electrode portion are also different from each other. The amounts of changes in capacitances between the sensing electrode regions with the different areas and the driving electrode portion and the capacitances to earth may be different before and after the occurrence of a touch, such that the detected change amount of signal may be different. Therefore, a plurality of touch positions may be positioned using one sensing electrode block.

In this embodiment, the sensing electrode block has a regular shape, the sensing electrode block has sensing electrode regions with different areas, and the sensing electrode block has an integral structure as one piece. The number of the divided sensing electrode regions of the sensing electrode block is related to the sensitivity of the detection element for detecting a change amount of the signal.

In the touch electrode pattern shown in FIG. 2, the driving electrodes and the sensing electrodes both are made of a metal mesh film layer, and for example the sensing electrode blocks 30 have a right-triangle shape. The long leg of the sensing electrode block 30 has a length in a range of 10 mm to 30 mm, for example, 20 mm. The short leg of the sensing electrode block 30 has a length in a range of 4 mm to 10 mm, for example, 7 mm. For the sensing electrode blocks 30 with the long leg L1 of 20 mm and the short leg L2 of 7 mm, when a driving signal is applied to the driving electrode, amounts of changes in signals from the four different regions of each sensing electrode block may be determined by detecting a change in signal from each sensing electrode block. With each sensing electrode block having the four sensing electrode region, a touch region of 5 mm*5 mm can be identified, and the sensitivity is substantially the same as that of the conventional mutual-capacitance touch control panel. In the case where the sensing electrode block 30 has a right-triangle shape as shown in FIG. 2, the capacitance is distributed evenly, which is advantageous for improving the sensitivity of detection.

Figure 41:
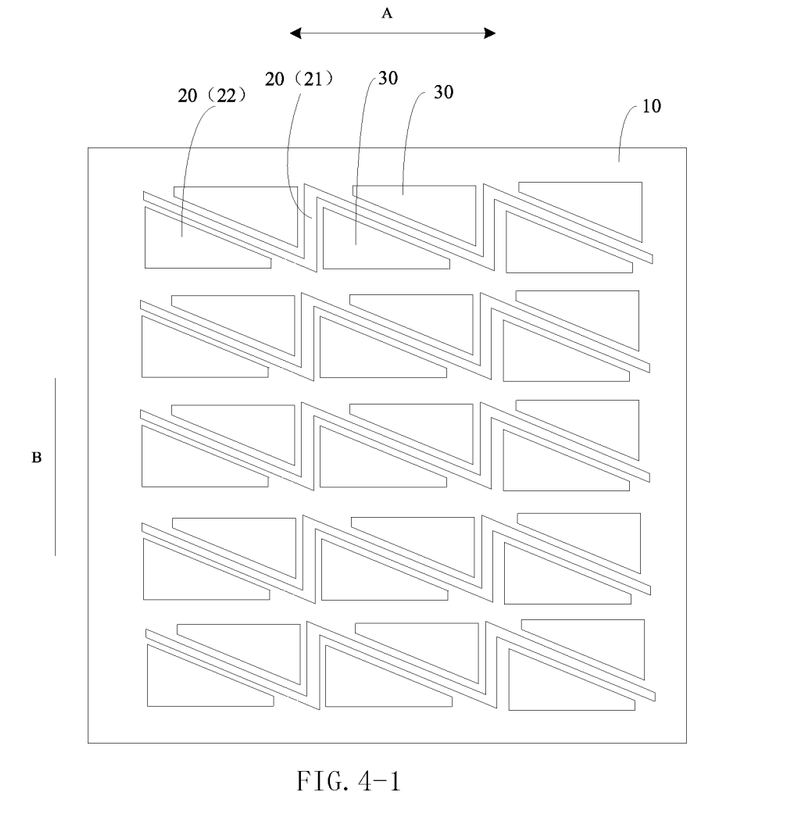
Figure 42:
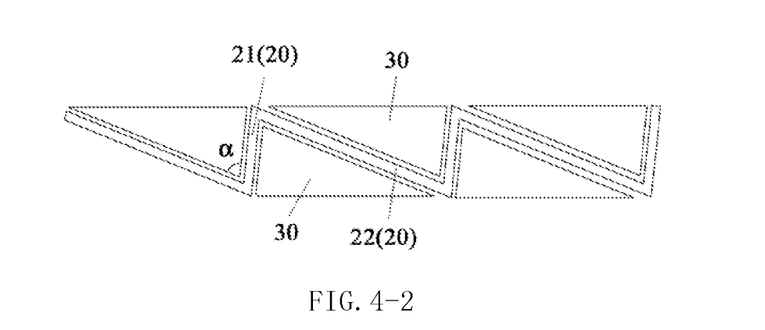

The sensing electrode block 30 may be in a regular shape. For example, the sensing electrode block 30 may have a trapezoid shape (e.g., a right trapezoid shape) as shown in FIG. 4-1 or an acute-triangle shape as shown in FIG. 4-2, in addition to the right triangle shape shown in FIG. 1. The driving electrode portion 20 may have a strip shape. As shown in FIG. 4-1, the first driving electrode portion 21 extends in a second direction (the direction indicated by the arrow B in FIG. 4-1), and the second driving electrode portion 22 extends in an oblique direction. A first angle α, which is an acute angle, is formed between two adjacent driving electrode portions 21 and 22. One sensing electrode block 30 is disposed on each of opposite sides of the driving electrode portion 20. The hypotenuse (or the longer side of the trapezoidal sensing electrode block 30) and a leg extending in the second direction of the triangular sensing electrode block 30 on each side of the driving electrode portion 20 form a first angle α. One sensing electrode block 30 is disposed on each of the upper and lower sides of the second driving electrode portion 22 extending in the oblique direction. In other words, two sensing electrode blocks 30 are disposed on both sides of the second driving electrode portion 22 in a direction perpendicular to or intersecting with the oblique direction. Moreover, one sensing electrode block 30 is disposed on each of the left and right sides of the first driving electrode block 21. Thus, as shown in FIG. 1 and FIG. 4-1, both sides of the second driving electrode portion 22 extending in the oblique direction may be filled with two sensing electrode blocks 30 respectively, such that the sides of the sensing electrode blocks 30 distal to the driving electrode portions 21 and 22 are all in a same straight line, thereby effectively utilizing the effective area of the base substrate, improving the occupancy rate of the touch electrode pattern on the base substrate as a whole, and improving the utilization rate of the base substrate.

FIG. 4-2 is a schematic diagram showing a structure of a sensing electrode block according to an exemplary embodiment of the disclosure. As shown in FIG. 4-2, the structure of the sensing electrode block shown in FIG. 4-2 is substantially the same as that of the sensing electrode block shown in FIG. 1, except that the extension direction of the driving electrode portion 21 in FIG. 4-2 is at an angle with respect to the second direction. Therefore, detailed description thereof is omitted.

Figure 43:
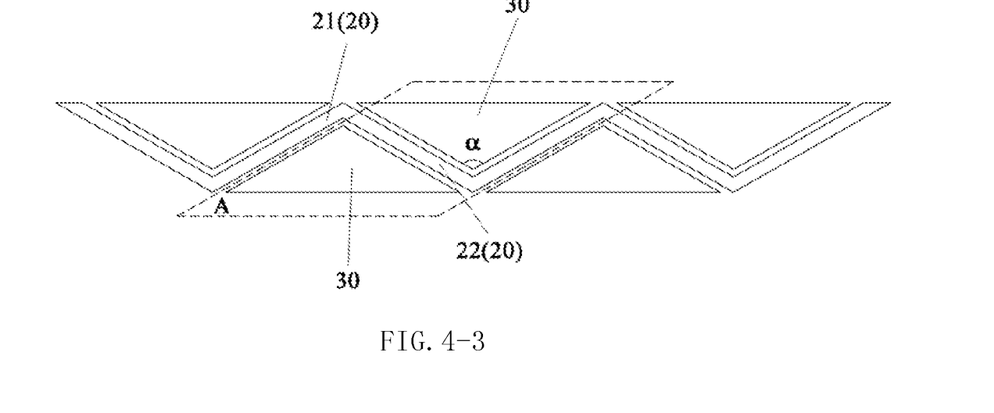
Figure 44:
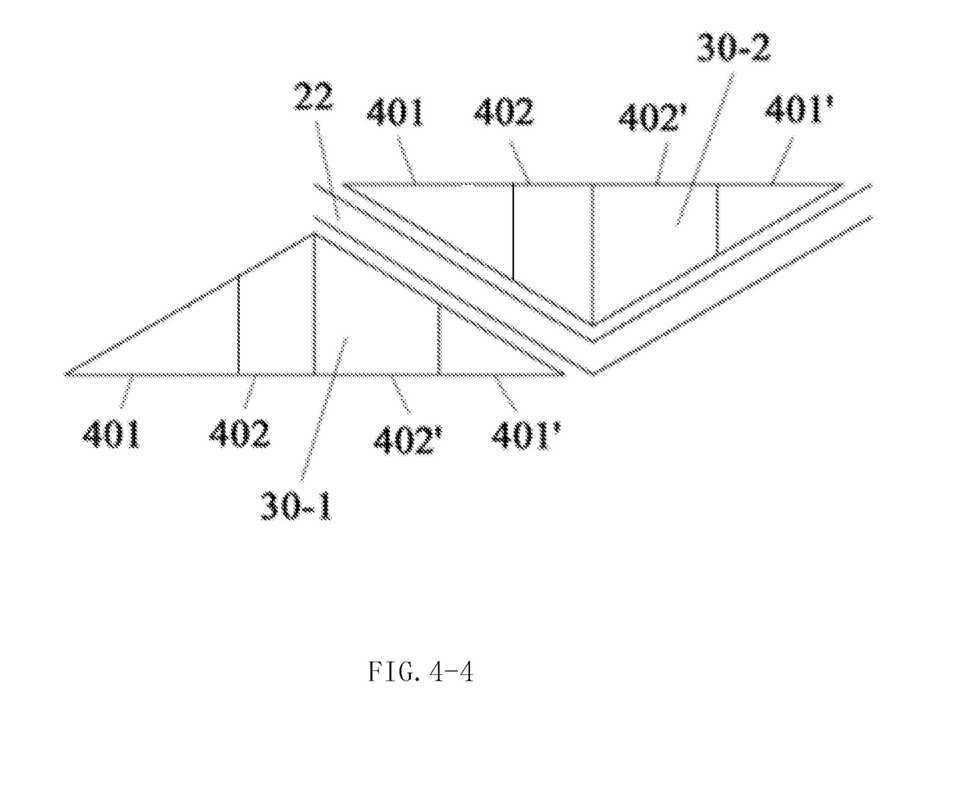

In an embodiment, the sensing electrode block 30 may also have a shape of an isosceles obtuse triangle, as shown in FIG. 4-3 and FIG. 4-4. The second driving electrode portion 22 extends in a first oblique direction, and the first driving electrode portion 21 extends in a second oblique direction symmetrical to the first oblique direction with respect to the second direction, such that a first angle α, which is an obtuse angle, is formed between two adjacent driving electrode portions 21 and 22. The included angle between two sides of the sensing electrode block 30 in a shape of an isosceles obtuse triangle is the first angle α, which is an obtuse angle.

It is to be noted that the shape of the sensing electrode is not limited to the acute triangle, the right triangle, the isosceles obtuse triangle, or right trapezoid as described above, and other shapes that can be conceived by those skilled in the art are also applicable to the present disclosure.

FIG. 4-4 is an enlarged diagram of region A of FIG. 4-3. As shown in FIG. 4-4, in the case where the sensing electrode block 30 has a shape of an isosceles obtuse triangle, the sensing electrode block 30 in a shape of the isosceles obtuse triangle may be divided into four sensing electrode regions 401, 402, 401', 402' with different areas.

Figure 5:
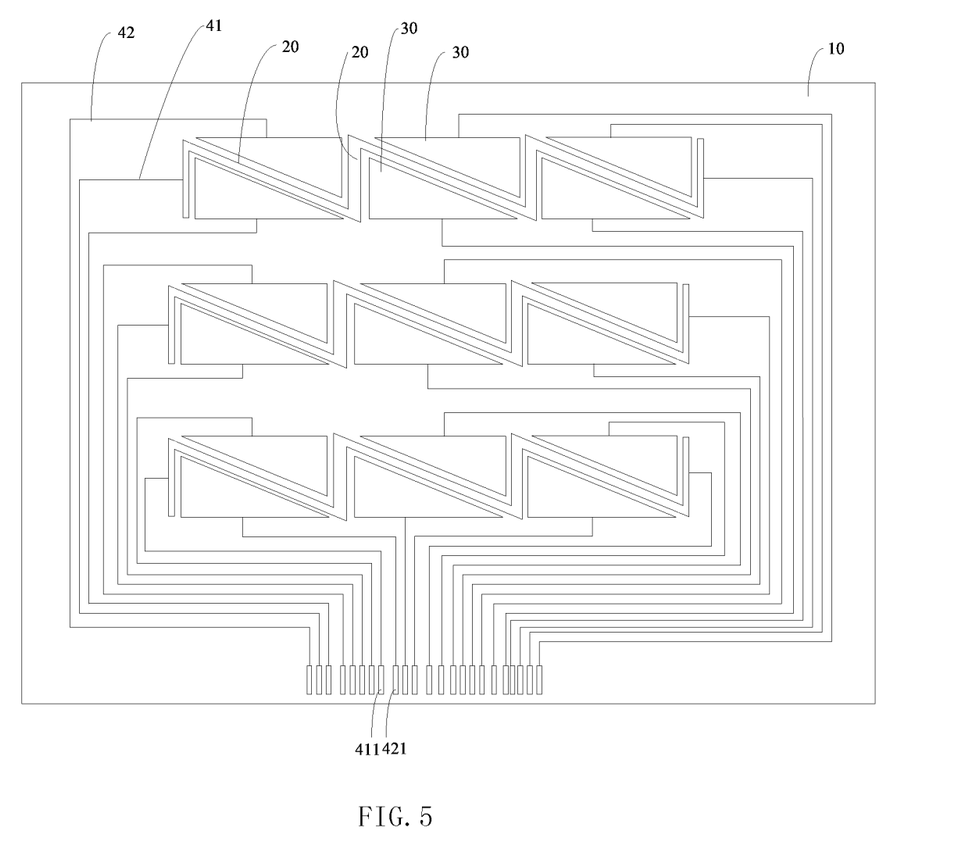
FIG. 5 is a schematic diagram showing a structure of a touch substrate according to another exemplary embodiment of the disclosure.

FIG. 5 is a schematic diagram showing a structure of a touch substrate according to an exemplary embodiment of the disclosure. As shown in FIG. 5, a plurality of driving electrode lines 41 and a plurality of sensing electrode lines 42 are further provided on the base substrate 10. The driving electrodes are coupled to corresponding driving electrode lines 41 respectively, and the sensing electrode blocks 30 in the sensing electrodes are coupled to corresponding sensing electrode lines 42 respectively.

Since the driving electrode portions are coupled end to end to form one driving electrode, one driving electrode portion located at the leftmost end among the driving electrode portions in each row may be coupled to one driving electrode line. Alternatively, for a larger-sized base substrate, each of two driving electrode portions located at the leftmost and rightmost ends among the driving electrode portions in each row may be coupled to one driving electrode line 41 respectively, to input a driving signal to the driving electrode through the driving electrode lines on the two sides, thereby reducing signal attenuation due to the resistance of the driving electrode.

Since the sensing electrode includes a plurality of sensing electrode blocks in each row and each sensing electrode block is respectively coupled to one sensing electrode line, the sensing signal from a corresponding sensing electrode block is transmitted through the sensing electrode line.

In the case where the driving electrode portion is coupled to the driving electrode line, as shown in FIG. 5, one single driving electrode portion is provided at each of two ends of the driving electrode, and each of the two driving electrode portions at the two ends is coupled to one driving electrode line. Alternatively, the driving electrode portions extending in the oblique direction at both ends of the driving electrode may be directly coupled to the two driving electrode lines, respectively.

In this embodiment, the driving electrode lines and the sensing electrode lines are provided. A driving signal applied to the driving electrode may be transmitted through the driving electrode line, and a sensing signal output from the sensing electrode may be transmitted through the sensing electrode line, and the sensing signal as a detection signal is transmitted to the detection element for positioning the touch position.

In a case that the touch electrode pattern includes a plurality of rows of electrodes including the driving electrodes and the sensing electrodes, a driving signal may be input to the driving electrodes in the plurality of rows in sequence through the corresponding driving electrode lines in a scanning mode, and sensing signals may be output from the sensing electrodes in sequence through the corresponding sensing electrode lines in a scanning mode, thereby realizing the positioning of the touched region of the touch substrate.

In some examples, as shown in FIG. 5, bonding pins 411 of the driving electrode lines 41 and bonding pins 421 of the sensing electrode lines 42 are located in a peripheral region (also referred as a non-display region) on the same side of the base substrate 10.

A plurality of peripheral regions of the base substrate are non-display regions. The bonding pin is a terminal coupling the driving electrode line to an external drive circuit, or a terminal coupling the sensing electrode line to an external detection element. The bonding pins are all provided in one of the plurality of peripheral regions, for example, as shown in FIG. 5, the bonding pins are all located in one peripheral region in the lower part of the base substrate, so that the area of the remaining peripheral regions that are not occupied by the bonding pins can be reduced, which is advantageous for realizing the narrow-frame of the touch substrate.

In some examples, a color filter layer is further formed on a surface of the base substrate opposite to a surface thereof on which the touch electrode pattern is disposed.

One surface (for example, referred to as a first surface) of the base substrate is provided thereon with the touch electrode pattern, and the other surface (i.e., a surface opposite to the first surface) of the base substrate is provided thereon with a color filter layer. The touch substrate can serve as a color filter substrate of a touch display panel to form an on-cell touch display panel.

The color filter layer may also be referred to as a Color Filter (CF). The color filter layer may include a color resist layer and a black matrix layer that are spaced apart from each other. The color resist layer may include a red resist block, a green resist block and a blue resist block, and the resist blocks are spaced apart from each other by the black matrix layer. The color resist layer is configured to filter the light to display a color picture, and the black matrix layer serves to prevent color mixing and light leakage.

An embodiment of the disclosure further provides a touch display panel, which includes the touch substrate described in any one of the above embodiments.

The touch display panel may be a capacitive touch screen in various forms, such as an OGS touch screen, an on-cell touch screen, an in-cell touch screen and the like.

Figure 6:
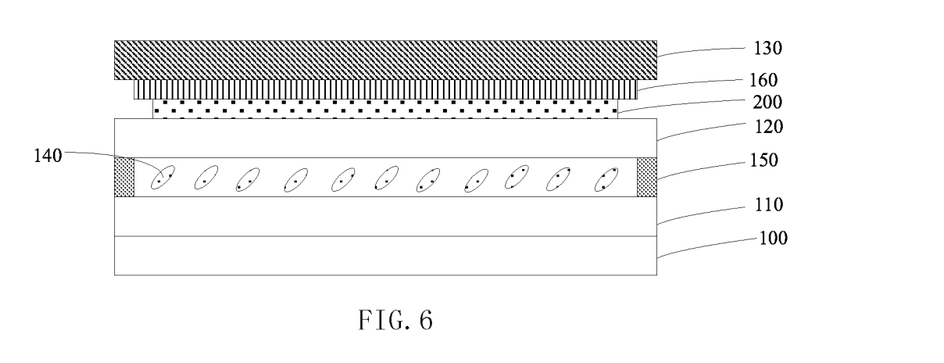
FIG. 6 is a cross-sectional diagram showing a structure of a touch display panel according to another exemplary embodiment of the disclosure.

FIG. 6 is a cross-sectional diagram showing a structure of an on-cell touch display panel. Referring to FIG. 6, the touch display panel has a liquid crystal display screen. The liquid crystal display screen may sequentially include, from bottom to top, a backlight 100, an array substrate 110, a color filter substrate 120, and a cover plate 130. A liquid crystal layer 140 is disposed between the array substrate 110 and the color filter substrate 120 which are adhered together by a sealant 150.

The touch electrode pattern 200 according to any one of the above embodiments may be formed on a surface of the color filter substrate 120 distal to the array substrate 110 (i.e., a surface on which no color filter layer is formed). The color filter substrate 120 may serve as the touch substrate. An upper polarizer 160 may be further formed on the touch electrode pattern 200 on the color filter substrate 120, and a cover plate 130 is further provided on the upper polarizer 160 to form a touch display panel which is an on-cell touch screen.

Apparently, the touch display panel may also include other type of display screen, such as an Organic Light Emitting Diode (OLED) display screen or a Light Emitting Diode (LED) display screen, and the disclosure is not limited thereto.

Specific applications of the touch substrate according to the embodiments of the disclosure will be described below. The touch substrate according to the embodiment of the disclosure may be applied to a keyboard. The touch display panel in a strip shape described in the above embodiment is disposed on a main body of the keyboard, and the touch display panel is disposed in a peripheral region of the main body of the keyboard.

Figure 7:
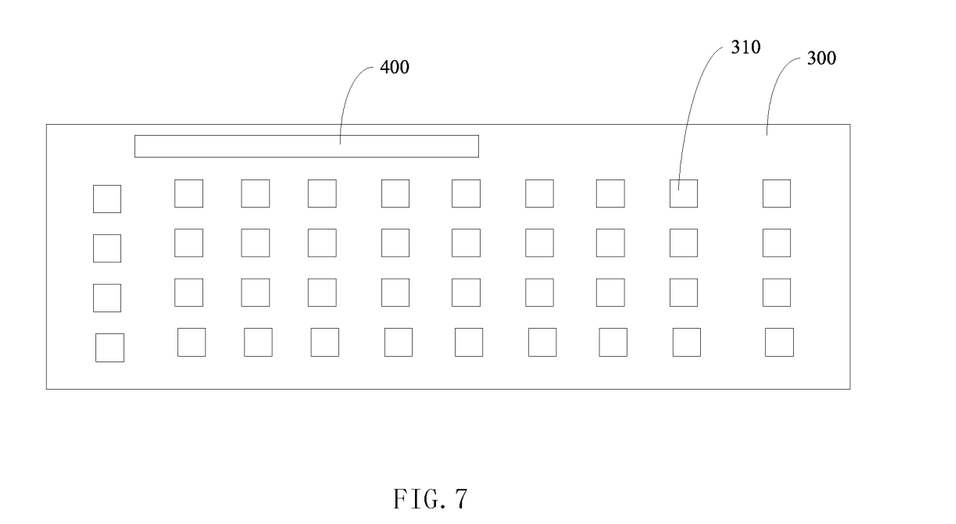
FIG. 7 is a schematic diagram showing a structure of a keyboard according to an exemplary embodiment of the disclosure.

FIG. 7 is a cross-sectional diagram showing a structure of a keypad according to an exemplary embodiment of the disclosure. The touch display device according to the embodiment may be a keyboard. A touch display panel, which is referred as a touch bar, is disposed on a main body of the keyboard, and may serve as a touch key of the keyboard in which the function of the keys may be implemented in a touch manner, which may realize more functions of the keys in a small space of the main body of the keyboard, thereby facilitating the thin and light design of the keyboard.

As shown in FIG. 7, a touch display panel 400 is provided on a main body 300 of the keyboard, and mechanical keys 310 arranged regularly are provided on the main body 300. FIG. 7 schematically shows the mechanical keys 310 only, and does not represent the actual arrangement of the mechanical keys 310. In order to reduce the influence of providing the touch display panel on the main body 300 on the design of the existing layout of the keys and to avoid the influence on the habit of using the existing key arrangement by the user, the touch display panel 400 is designed to have a strip shape and is arranged in the peripheral region of the main body 300. As such, the existing arrangement of the keys is not influenced.

Figure 8:
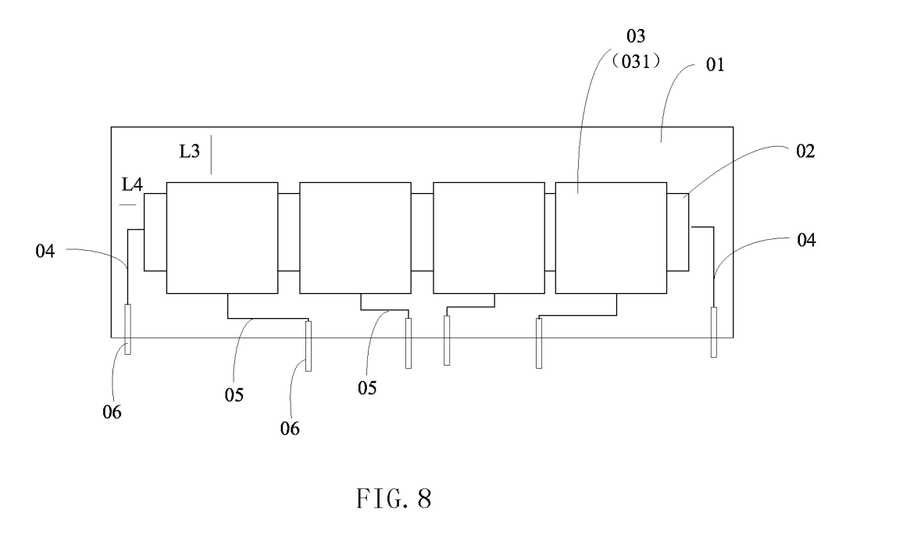
FIG. 8 is a schematic diagram showing a structure of a touch substrate according to the related art.

FIG. 8 is a schematic diagram showing a structure of a touch substrate according to the related art. Referring to FIG. 8, a touch electrode pattern on a touch substrate in a touch display panel disposed on a keyboard according to the related art is provided. The touch electrode pattern includes a driving electrode 02 and a sensing electrode 03 on a base substrate 01. The driving electrode 02 includes a whole block of driving electrode block extending along a first direction (i.e., a lateral direction) of the base substrate, and the sensing electrode 03 includes a plurality of sensing electrode blocks 031 arranged along the first direction of the base substrate. The driving electrode 02 and the sensing electrodes 03 are disposed in two layers and insulated from each other by an insulating layer.

As shown in FIG. 8, in the touch substrate of the touch display panel provided on the keyboard, only one row including the driving electrode 02 and the sensing electrode 03 is disposed along the first direction of the base substrate 10, and the driving electrode lines 04 and the sensing electrode lines 05 are further disposed on the base substrate 10. Each of two ends of the driving electrodes 02 is respectively coupled to one driving electrode line 04, and each sensing electrode block 031 is respectively coupled to one sensing electrode line 05.

In the touch display panel formed by using the touch substrate having the touch electrode pattern of this structure, a display region has a size of about 7 mm*300 mm with the touch electrode pattern being disposed in the display region. A peripheral region (i.e., a non-display region) on the upper side of the base substrate 01 and a peripheral region on the lower side of the base substrate 01 both have a width L3 of for example 5 mm, and a peripheral region on the left side of the base substrate 01 and a peripheral region on the right side of the base substrate 01 both have a width L4 of for example 2 mm. A touch region of each sensing electrode block has a size of for example 5 mm*5 mm.

For the touch display panel of the above-mentioned size, one driving electrode, 60 sensing electrode blocks, two driving electrode lines, 60 sensing electrode lines, and three ground lines are required to be provided, that is, about 65 electrode lines in total are required to be provided. Referring to FIG. 8, the driving electrode lines and the sensing electrode lines each have a bonding pin, such as the bonding pin 06 shown in FIG. 8. If the bonding pins are provided in the peripheral region on the lower side of the base substrate 01, a length of a bonding region occupied by the bonding pins is at least 13 mm, which is far beyond the width L3 of the peripheral region on the lower side of the base substrate 01. If a part of the bonding pins are provided in the peripheral regions on the left or the right sides of the base substrate 01, since the bonding pin has a height of 1 mm, the peripheral regions are not big enough to accommodate the bonding pins. Therefore, the touch display panel manufactured with the above touch electrode pattern cannot meet the requirement of setting the touch display region in the remaining space of the main body of the keyboard.

Figure 9:
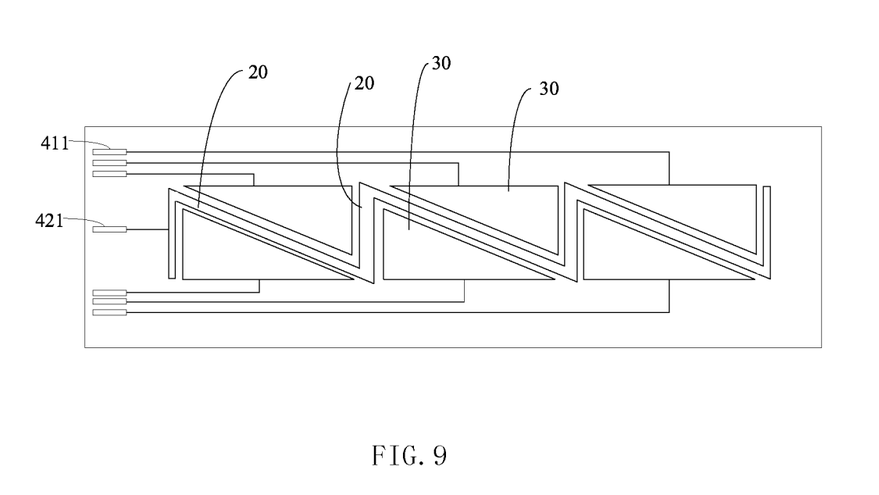
FIG. 9 is a schematic diagram showing a structure of a touch substrate according to an exemplary embodiment of the disclosure.

FIG. 9 is a schematic diagram of a structure of a touch substrate according to an exemplary embodiment of the disclosure. As shown in FIG. 9, in the touch substrate, only one electrode row including a driving electrode and a sensing electrode is disposed along a first direction of the base substrate 10. The driving electrode has a plurality of driving electrode portions 20 coupled to each other (i.e., coupled end to end), and the sensing electrode includes a plurality of sensing electrode blocks 30. The driving electrode is coupled to one driving electrode line 41, and each sensing electrode block 30 is coupled to one sensing electrode line 42. The bonding pin 411 of the driving electrode line 41 and the bonding pins 421 of the sensing electrode lines 42 are all located in a peripheral region on the left side of the base substrate 10, i.e., the non-display region.

The touch display panel manufactured with the touch substrate having the structure describe above may be applied to a keyboard. In the case that the touch display panel has the same size as that of the touch display panel according to the above related art, the number of the driving electrode line and the sensing electrode lines in the touch display substrate may be controlled to be less than 50, and then the bonding pins for the driving electrode line and the sensing electrode lines may be disposed in the peripheral region on the left side or the right side of the base substrate, i.e., the non-display region. The width of the peripheral region on the left side or the right side may satisfy the width requirement for disposing the bonding pins and the requirement on the space occupied by the bonding pins, and therefore the touch display panel manufactured by using the touch electrode pattern described above can satisfy the requirement for disposing the touch display region in the remaining space of the keyboard.

Apparently, the touch display device is not limited to a keyboard, but may be other type of touch display device, such as a tablet computer, a mobile terminal, and the like.

For the touch display device in which the touch display panel is required to be disposed in the strip-shaped region, the touch electrode pattern described in the above embodiment may be applied to the touch display panel, so as to meet the space requirement of the touch display device for disposing the touch display panel.

Figure 10:
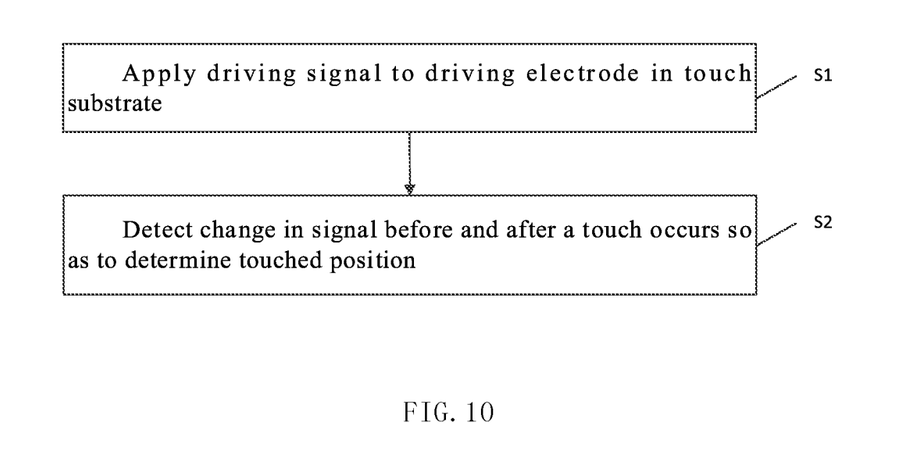
FIG. 10 is a flow chart showing a touch driving method according to an exemplary embodiment of the disclosure.

FIG. 10 shows a flowchart of a touch driving method according to an embodiment of the disclosure. The touch driving method is used for driving the touch substrate according to any one of the above embodiments, and the touch driving method includes step S1 and step S2.

At step S1, a driving signal is applied to the driving electrode of the touch substrate.

At step S2, a change in signal before and after a touch occurs is detected, so as to determine a position where the touch occurs. The change in signal is a change in the capacitance between a touched sensing electrode region of the sensing electrode block and the driving electrode.

Other embodiments of the disclosure will be apparent to those skilled in the art after consideration of the specification and practice of the disclosure disclosed herein. The present disclosure is intended to cover any variations, usage, or adaptive changes of the present disclosure, which are in accordance with the general principles of the present disclosure and include common knowledge or conventional technical means in the art that are not disclosed in the present disclosure. The specification and examples are to be regarded as illustrative only, and the scope and spirit of the disclosure is claimed by the following claims.

It is to be understood that the disclosure is not limited to the precise structure described above and illustrated in the drawings, and various modifications and changes may be made without departing from the scope of the disclosure. The scope of the disclosure is to be limited only by the appended claims.

The invention claimed is:

1. A touch substrate comprising:
   a base substrate, on which a touch electrode pattern is formed,
   wherein the touch electrode pattern comprises at least one electrode group, and each electrode group comprises a driving electrode and a sensing electrode which are arranged in a row along a first direction of the base substrate and insulated from each other;
   in each electrode group, the driving electrode has a plurality of driving electrode portions coupled to each other, and the sensing electrode has a plurality of sensing electrode blocks;
   each driving electrode portion is respectively between two adjacent sensing electrode blocks;
   the sensing electrode block has a plurality of sensing electrode regions with different areas,
   the plurality of driving electrode portions are coupled end to end and arranged in a zigzag form along the first direction of the base substrate,
   the plurality of driving electrode portions comprise a plurality of first driving electrode portions each of which extends along a second direction perpendicular to the first direction and a plurality of second driving electrode portions each of which extend along an oblique direction with respect to the first direction and the second direction, and
   each of the plurality of first driving electrode portions extending along the second direction is coupled to one of the plurality of second driving electrode portions at one end, and coupled to another of the plurality of second driving electrode portions at the other end.

2. The touch substrate according to claim 1, wherein one sensing electrode block is formed on each of two opposite sides of each driving electrode portion.

3. The touch substrate according to claim 2, wherein
a sensing electrode block, which is on one side of each of the driving electrode portions extending in the second direction intersecting the first direction, has a width along the second direction, which is gradually decreased along the first direction; and
a sensing electrode block, on the other side of the driving electrode portion, has a width along the second direction, which is gradually decreased along the first direction.

4. The touch substrate according to claim 3, wherein
each sensing electrode block has a triangle or trapezoid shape.

5. The touch substrate according to claim 4, wherein
each of the sensing electrode blocks has a right triangle shape, and
one leg and a hypotenuse of each sensing electrode block are respectively parallel to two adjacent driving electrode portions.

6. The touch substrate according to claim 5, wherein
a longer leg of each sensing electrode block has a length in a range of 10 mm to 30 mm; and
a shorter leg of each sensing electrode block has a length in a range of 4 mm to 10 mm.

7. The touch substrate according to claim 6, wherein
two legs of each sensing electrode block respectively have lengths of 7 mm and 20 mm.

8. The touch substrate according to claim 4, wherein
each sensing electrode block has a right trapezoid shape; and
a longer base and a side of each sensing electrode block are respectively parallel to two adjacent driving electrode portions.

9. The touch substrate according to claim 1, wherein
the driving electrode and the sensing electrode are on a same layer, and
the driving electrode portions are spaced apart from the sensing electrode blocks.

10. The touch substrate according to claim 1, wherein
the driving electrode and the sensing electrode each have a metal mesh structure.

11. The touch substrate according to claim 1, wherein
the second direction and the oblique direction form a first angle that is an acute angle.

12. The touch substrate according to claim 1, wherein
each of the driving electrode portions has a strip shape.

13. The touch substrate according to claim 1, further comprising a plurality of driving electrode lines and a plurality of sensing electrode lines on the base substrate;
the driving electrode is respectively coupled to a corresponding driving electrode line; and
the sensing electrode blocks are respectively coupled to corresponding sensing electrode lines.

14. The touch substrate according to claim 13, further comprising bonding pins for the driving electrode lines and bonding pins for the sensing electrode lines, wherein
the bonding pins for the driving electrode lines and the bonding pins for the sensing electrode lines are in a non-display region on a same side of the base substrate.

15. The touch substrate according to claim 1, further comprising a color filter layer on a surface of the base substrate opposite to a surface of the base substrate on which the touch electrode pattern is formed.

16. A touch display panel comprising a touch substrate, wherein the touch substrate is the touch substrate of claim 1.

17. A touch display device comprising a touch display panel, wherein the touch display panel is the touch display panel according to claim 16.

18. A method for driving a touch substrate, wherein the touch substrate comprises a base substrate, on which a touch electrode pattern is formed,
the touch electrode pattern comprises at least one electrode group, and each electrode group comprises a driving electrode and a sensing electrode which are arranged in a row along a first direction of the base substrate and insulated from each other;
in each electrode group, the driving electrode has a plurality of driving electrode portions coupled to each other, and the sensing electrode has a plurality of sensing electrode blocks;
each driving electrode portion is respectively between two adjacent sensing electrode blocks;
the sensing electrode block has a plurality of sensing electrode regions with different areas,
the plurality of driving electrode portions are coupled end to end and arranged in a zigzag form along the first direction of the base substrate,
the plurality of driving electrode portions comprise a plurality of first driving electrode portions each of which extends along a second direction perpendicular to the first direction and a plurality of second driving electrode portions each of which extends along an oblique direction with respect to the first direction and the second direction, and
each of the plurality of first driving electrode portions extending along the second direction is coupled to one of the plurality of second driving electrode portions at one end, and coupled to another of the plurality of second driving electrode portions at the other end,
wherein the method comprises:
applying a driving signal to the driving electrode; and
detecting a change in signal before and after a touch occurs so as to determine a touched position on the touch substrate, wherein the change in signal is a change in signal between a touched sensing electrode region of the sensing electrode block and the driving electrode.

* * * * *